(12) United States Patent
Das et al.

(10) Patent No.: US 11,915,118 B2
(45) Date of Patent: *Feb. 27, 2024

(54) METHOD AND APPARATUS FOR PROCESSING COMPUTATION OF ZERO VALUE IN PROCESSING OF LAYERS IN NEURAL NETWORK

(71) Applicant: Samsung Electronics Co., Ltd., Suwon-si (KR)

(72) Inventors: Saptarsi Das, Bangalore (IN); Sabitha Kusuma, Bangalore (IN); Sehwan Lee, Suwon-si (KR); Ankur Deshwal, Bangalore (IN); Kiran Kolar Chandrasekharan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,210

(22) Filed: Feb. 8, 2023

(65) Prior Publication Data

US 2023/0186050 A1 Jun. 15, 2023

Related U.S. Application Data

(63) Continuation of application No. 16/816,861, filed on Mar. 12, 2020, now Pat. No. 11,604,958.

(30) Foreign Application Priority Data

Mar. 13, 2019 (IN) .............................. 201941009806
Jan. 29, 2020 (KR) ......................... 10-2020-0010482

(51) Int. Cl.
  *G06N 3/04* (2023.01)
  *G06F 17/16* (2006.01)
(52) U.S. Cl.
  CPC ............... *G06N 3/04* (2013.01); *G06F 17/16* (2013.01)
(58) Field of Classification Search
  CPC .................................. G06N 3/04; G06F 17/16
  See application file for complete search history.

(56) References Cited

U.S. PATENT DOCUMENTS

| | | |
|---|---|---|
| 9,779,786 B1 | 10/2017 | Wu et al. |
| 9,818,059 B1 | 11/2017 | Woo et al. |
| 11,604,958 B2 * | 3/2023 | Das ........................ G06F 17/16 |
| 2015/0212861 A1 | 7/2015 | Canoy et al. |
| 2016/0350645 A1 | 12/2016 | Brothers et al. |
| 2016/0358068 A1 | 12/2016 | Brothers et al. |
| 2017/0344876 A1 | 11/2017 | Brothers |
| 2018/0046898 A1 | 2/2018 | Lo |
| 2018/0089562 A1 | 3/2018 | Jin et al. |
| 2019/0340493 A1 | 11/2019 | Coenen et al. |

FOREIGN PATENT DOCUMENTS

| | | |
|---|---|---|
| CN | 106875011 A | 6/2017 |
| CN | 108520297 A | 9/2018 |

\* cited by examiner

*Primary Examiner* — Stephen G Sherman
(74) *Attorney, Agent, or Firm* — NSIP Law

(57) ABSTRACT

A method and an apparatus for processing layers in a neural network fetch Input Feature Map (IFM) tiles of an IFM tensor and kernel tiles of a kernel tensor, perform a convolutional operation on the IFM tiles and the kernel tiles by exploiting IFM sparsity and kernel sparsity, and generate a plurality of OFM tiles corresponding to the IFM tiles.

18 Claims, 15 Drawing Sheets

FIG. 10B

|  | CONV_DATAPATH (without zero skipping) | CONV_DATAPATH (with zero skipping) |
|---|---|---|
| Inception-V3 | 4085014 | 3287600 |

US 11,915,118 B2

METHOD AND APPARATUS FOR PROCESSING COMPUTATION OF ZERO VALUE IN PROCESSING OF LAYERS IN NEURAL NETWORK

CROSS-REFERENCE TO RELATED APPLICATION

This application is a continuation of application Ser. No. 16/816,861 filed on Mar. 12, 2020 and claims the benefit under 35 U.S.C. § 119 of Indian Patent Application No. 201941009806, filed on Mar. 13, 2019 in the Indian Patent Office, and Korean Patent Application No. 10-2010-0010482, filed on Jan. 29, 2020 in the Korean Intellectual Property Office, the entire disclosures of which are incorporated herein by reference for all purposes.

BACKGROUND

1. Field

The following description relates to processing of neural networks, and more particularly, to reducing execution time and power dissipation in processing of layers in a neural network by eliminating or skipping computation of zero values.

2. Description of Related Art

A Convolutional Neural Network (CNN) is a deep, feed-forward artificial neural network (ANN), which may be used for tasks such as image recognition, video analysis and so on. Employing of the CNN involves two phases, namely a training phase and an inference phase. The training phase involves generating a trained CNN model by learning parameters of the CNN by using training examples (or training samples). The trained CNN model may include a plurality of processing layers and a set of kernel values/pixels associated with each processing layer. The inference phase predicts an output/label for a given input by processing the trained CNN model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatuses for processing computation of a zero value in processing of layers in a neural network.

In one general aspect, a method of processing layers in a neural network includes fetching, by a plurality of front-end cores, a plurality of Input Feature Map (IFM) tiles of at least one IFM tensor and a plurality of kernel tiles of at least one kernel tensor from a memory, wherein each IFM tile comprises a plurality of IFM pixels and each kernel tile comprises a plurality of kernel pixels; performing, by the plurality of front-end cores, a convolutional operation on the plurality of IFM tiles and the plurality of kernel tiles to produce a plurality of partial Output Feature Map (OFM) tiles by exploiting IFM sparsity and kernel sparsity, wherein the convolutional operation is performed by at least one front-end core exclusively or by the plurality of front-end cores in parallel; and generating, by a plurality of back-end accumulators, a plurality of OFM tiles corresponding to the plurality of IFM tiles using the produced plurality of partial OFM tiles.

In another general aspect, an apparatus for processing layers in a neural network includes a memory; a plurality of front-end cores coupled to the memory; and a plurality of back-end accumulators coupled to the memory and the plurality of front-end cores, wherein the plurality of front-end cores are configured to: fetch a plurality of Input Feature Map (IFM) tiles of at least one IFM tensor and a plurality of kernel tiles of at least one kernel tensor from the memory, wherein each IFM tile comprises a plurality of IFM pixels and each kernel tile comprises a plurality of kernel pixels; and perform a convolutional operation on the plurality of IFM tiles and the plurality of kernel tiles to produce a plurality of partial Output Feature Map (OFM) tiles by exploiting IFM sparsity and kernel sparsity, wherein the convolutional operation is performed by at least one front-end core exclusively or by the plurality of front-end cores in parallel, and wherein the plurality of back-end accumulators are configured to: generate a plurality of OFM tiles corresponding to the plurality of IFM tiles using the produced plurality of partial OFM tiles.

The fetching may include generating, by the plurality of front-end cores, memory addresses for a plurality of kernel channels of the plurality of kernel tiles; fetching, by the plurality of front-end cores, the plurality of kernels pixels of the plurality of kernel channels of the plurality of kernel tiles from different regions of the memory based on the generated memory addresses, wherein the fetched plurality of kernel pixels is compressed; and performing, by the plurality of front-end cores, decompression on the fetched plurality of kernel pixels.

Performing the convolutional operation may include determining, by the plurality of front-end cores, whether values of at least one IFM pixel of the plurality of IFM pixels or at least one kernel of the plurality of kernel pixels are zero values and non-zero values; detecting, by the plurality of front-end cores, at least one non-zero value pair in a case in which the at least one IFM pixel of the plurality of IFM pixels has a non-zero value and the at least one kernel of the plurality of kernel pixels has the non-zero value; and performing, by the plurality of front-end cores, Multiply-Accumulate (MAC) operations on the at least one non-zero value pair, wherein the plurality of front-end cores comprises a plurality of Processing Element (PE) arrays for performing the MAC operations.

The method may include performing, by the plurality of front-end cores, a zero skipping on detecting the zero non-zero value pairs, wherein during the zero skipping at least one OFM pixel remains unchanged; and performing, by the plurality of front-end cores, the convolutional operation on at least one successive IFM tile and at least one successive kernel tile based on a pre-defined traversal order by performing the zero skipping.

The determining may include representing, by the plurality of front-end cores, the plurality of IFM pixels of the plurality of IFM tiles and the plurality of kernel pixels of the plurality of kernel tiles in a vector format; generating, by the plurality of front-end cores, IFM bitmasks for the plurality of IFM pixels and kernel bitmasks for the plurality of kernel pixels based on the represented vector format of the plurality of IFM pixels and the plurality of kernel pixels; and comparing, by the plurality of front-end cores, the IFM bitmasks and the kernel bitmasks to detect the at least IFM pixel and the at least one kernel pixel having the zero value and the non-zero value in at least one position of the IFM bitmasks and the kernel bitmasks.

The method may include performing, by the plurality of front-end cores, a zero skipping on at least one of the at least one IFM pixel having a zero value in the at least one position of the IFM bitmask and the at least one kernel pixel having the zero value in the at least one position of the kernel bitmasks.

The at least one non-zero value pair may include the at least one IFM pixel having the non-zero value in the at least one position of the IFM bitmasks and the at least one kernel pixel having the non-zero value in the corresponding at least one position of the kernel bitmasks, and the at least one non-zero value pair may be used for generating the at least one OFM pixel.

The method may include selecting, by the plurality of front-end cores, the plurality of kernel pixels of the plurality of kernel channels of the plurality of kernel tiles for detecting the at least one non-zero value pair.

Performing the MAC operations may include performing, by the plurality of front-end cores, vector multiplications on at least one non-zero value pair of the at least one IFM pixel of the plurality of IFM pixels having the non-zero value and the at least one kernel pixel of the plurality of kernel pixels having the non-zero value; and accumulating, by the plurality of front-end cores, results of the vector multiplications to produce a plurality of partial OFM pixels of a plurality of OFM channels of the plurality of OFM tiles.

The method may include synchronizing, by the plurality of front-end cores, a plurality of PEs of the PE arrays after performing the MAC operations, and the plurality of PEs may be synchronized at a boundary of the plurality of kernel tiles or the plurality of kernel pixels.

Generating the plurality of OFM tiles may include accumulating a plurality of partial OFM pixels of a plurality of OFM channels of the plurality of partial OFM tiles; and combining the plurality of partial OFM pixels to generate the plurality of OFM tiles corresponding to plurality of IFM tiles using an index associated with the plurality of partial OFM pixels.

Methods and apparatuses for reducing execution time and power dissipation in processing of layers in a neural network by eliminating or skipping computations of zero values.

Methods and apparatuses for eliminating the zero computations by exploiting Input Feature Map (IFM) sparsity and Kernel sparsity.

Methods and apparatuses for performing a convolutional operation by tiling IFM tensor(s) and kernel tensor(s) to generate an Output Feature Map (OFM) tensor, wherein the OFM tensor may be generated by generating one OFM tile at a time.

Methods and apparatuses for performing the convolutional operation according to a channel-first input stationary loop traversal based order.

Methods and apparatuses for enabling inter-Processing Element (PE) synchronization at a kernel tile boundary or a kernel tile pixel.

Other features and aspects will be apparent from the following detailed description, the drawings, and the claims.

BRIEF DESCRIPTION OF THE DRAWINGS

FIGS. 10A and 10B are diagrams illustrating improved latency and execution time due to processing of layers of the CNN due to the elimination of zero computations, according to an example.

Figure 1A:
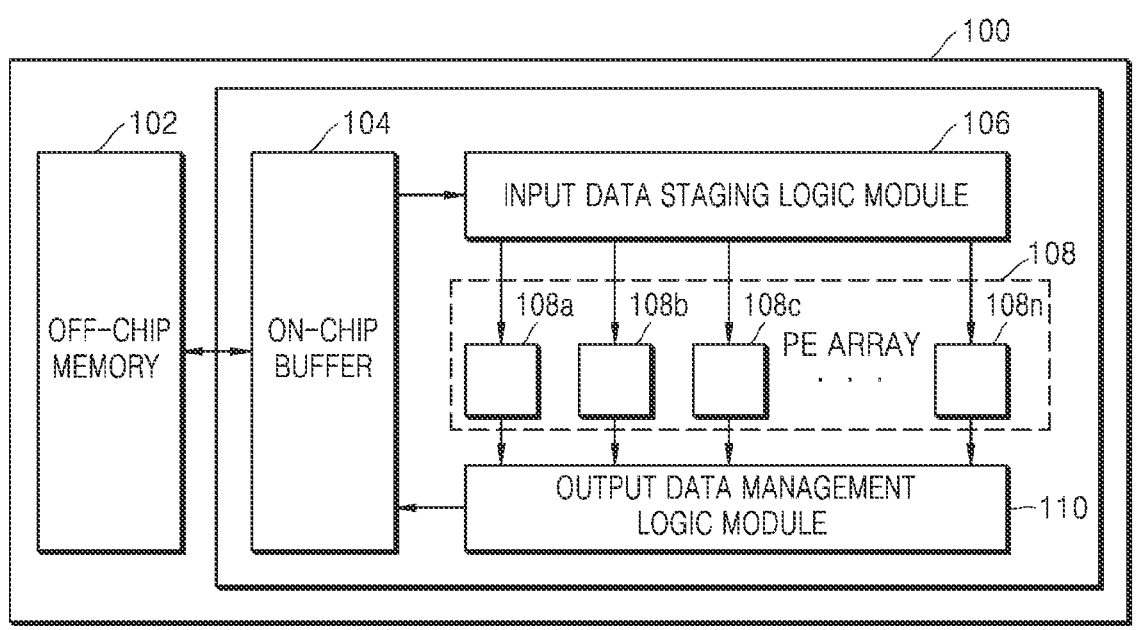
FIG. 1A illustrates architecture of a convolutional accelerator for processing layers of a trained convolutional neural network (CNN) model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Examples herein provide methods and apparatuses for eliminating or skipping computations of zero values in processing of layers in a neural network. Referring now to the drawings, where similar reference characters denote corresponding features consistently throughout the figures, there are shown examples.

FIG. 1A illustrates architecture of a convolutional accelerator 100 for processing layers of a trained CNN model. The trained CNN model includes a plurality of processing layers and kernel data associated with each processing layer. The convolutional accelerator 100 may include an off-chip memory 102, an on-chip buffer 104, an input data staging logic module 106, a Processing Element (PE) array 108 and an output data management logic module 110. The off-chip memory 102 stores Input Feature Map (IFM) data corresponding to an input (image, video, audio or the like) and the kernel data. The on-chip buffer 104 fetches IFM pixels and kernel pixels (of the IFM data and the kernel data) required for a convolutional operation, which may be performed to produce an Output Feature Map (OFM) for the IFM. The OFM may be further processed by different layers of the CNN to produce an output for the input. The on-chip buffer 104 also provides necessary storage for exploiting various kind of data reuse.

The input data staging logic module 106 fetches the IFM pixels and the kernel pixels required for performing the convolutional operation or Multiply-Accumulate (MAC) operation by the PE array 108. The PE array 108 includes a plurality of PEs 108a-108n. The PEs 108a-108n perform the convolutional operation on the IFM pixels and the kernel pixels received from the input data staging logic module 106. The convolutional operation involves performing multiplication on the IFM values and the kernel values to produce partial OFM pixels and accumulating/adding the partial OFM pixels to produce a single OFM pixel. However, the convolutional operation may include performing multiplication on the pixel (for example, the IFM pixel or the kernel pixel) against a zero value 0 (the zero value of the kernel pixel or zero values of the IFM pixel). Thus, this results in unwanted computations that further increase energy/power dissipation of the convolutional accelerator 100 and the execution time. Further, each PE 108a-108n may produce only single OFM pixel at a time which further increases the control overhead of convolution loop traversal. In addition, a local buffer of each PE 108a-108n may be difficult to buffer more than a certain amount of partial OFM pixels which may be required to form the complete OFM pixel.

Figure 1B:
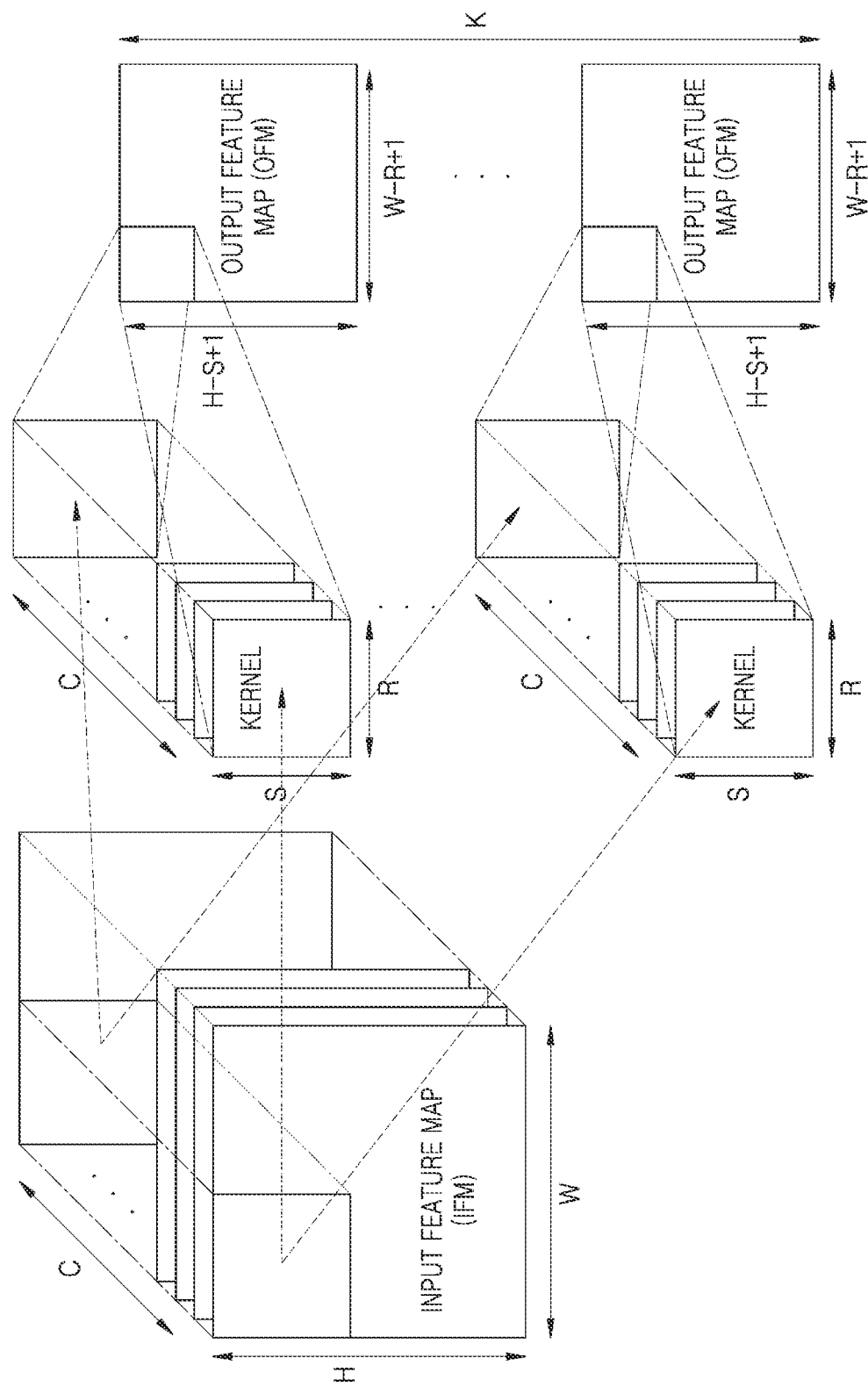
FIG. 1B is a diagram illustrating a convolutional operation performed by a conventional accelerator.

FIG. 1B is a diagram illustrating a convolutional operation performed by the conventional accelerator. In an example herein, the conventional accelerator 100 convolves an IFM tensor of dimension (H (height)×W (width)×C (number of channels/depth)) with all channels of the kernel tensor of dimension ((S (height)×R (width)×C (number of channels/depth)) to generate an OFM tensor for the IFM tensor. However, the OFM tensor may be processed by producing the single OFM pixel at a time. Thus, a pixel level computation increases the execution time and power dissipation.

Figure 2A:
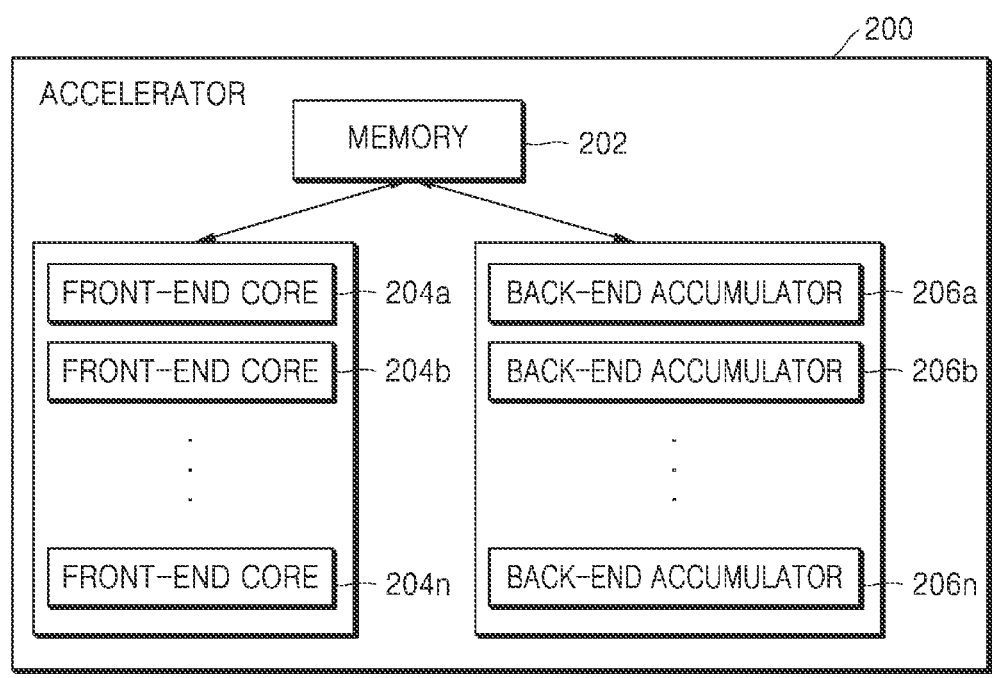
FIGS. 2A and 2B are diagrams for illustrating an accelerator, according to an example.
Figure 2B:
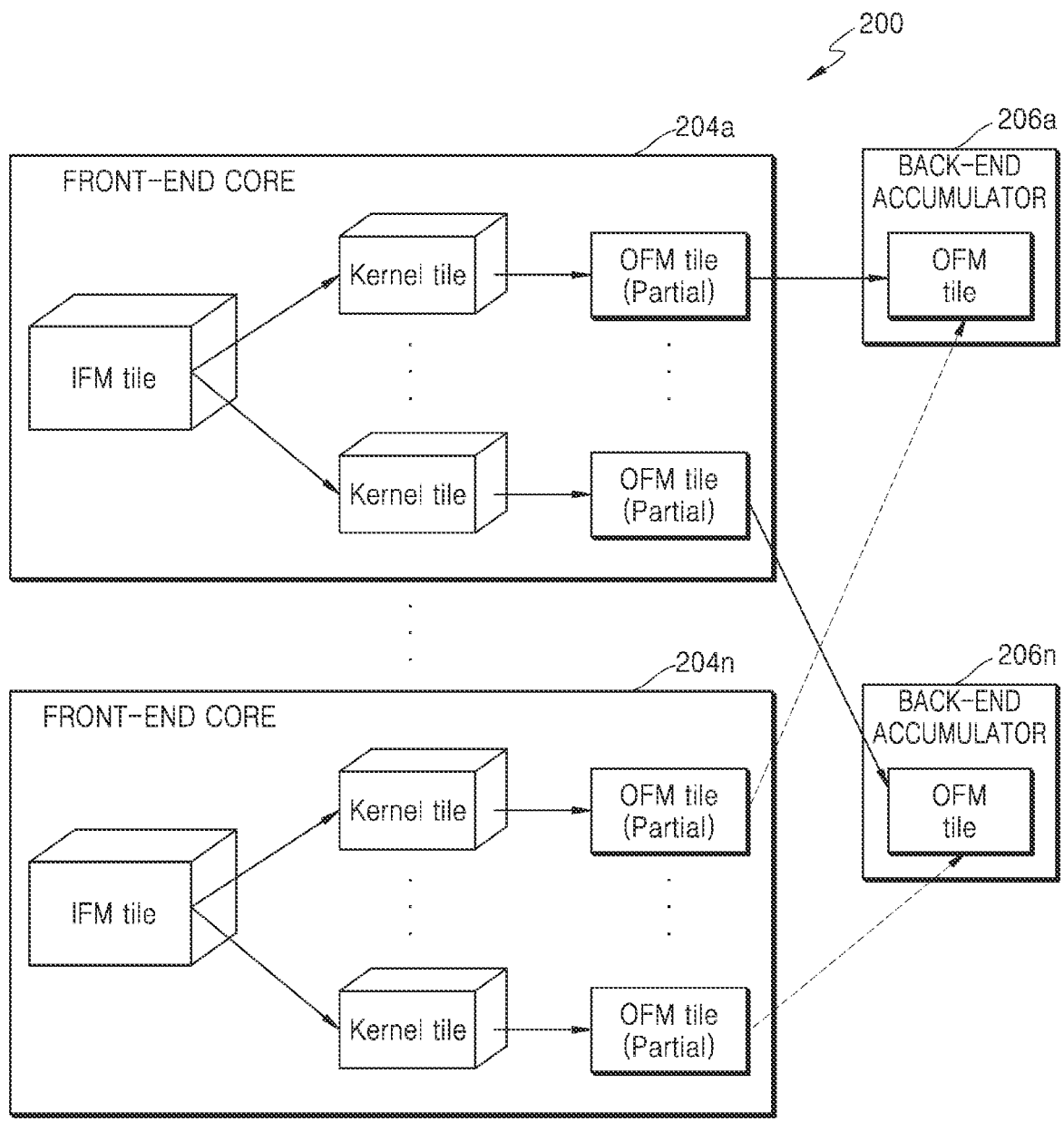

FIGS. 2A and 2B are diagrams for illustrating an accelerator 200, according to an example. The accelerator 200 corresponds to an apparatus for processing layers of a neural network and executes an inference phase of a neural network for predicting an input (an audio, speech, text, image, video and so on). In various examples, a Convolutional Neural Network (CNN) is explained as an example of the neural network, but any other deep, artificial feed-forward neural networks may be considered. The accelerator 200 may correspond to a central processing unit (CPU), a Graphic Processing Unit (GPU), a multi-core processor, a Field Programmable Gate Arrays (FPGAs), an Application Specific Integrated Circuits (ASICs) or any other special-purpose computing system. The accelerator 200 includes a memory 202, a plurality of front-end cores 204a-204n and a plurality of back-end accumulators 206a-206n.

The memory 202 may be a volatile memory which may be used to store the input, IFM data associated with the input, kernel data associated with a Convolutional Layer of the CNN, Output Feature Map data (OFM) and so on. Further, the memory 202 may include an IFM buffer for storing the IFM data and a kernel buffer for storing the kernel data. In various examples, a Static Random Access Memory (SRAM) is explained as an example of the memory 202, but any other form of memory, such as Dynamic Random Access Memory (DRAM), Synchronous Dynamic Random Access Memory (SDRAM) or the like may be considered.

The IFM data stored in the memory 202 corresponding to the input may indicate a height, a width and a depth of the input, wherein the depth corresponds to a number of IFM channels (e.g., Red Green Blue channels (RGB) for a first layer in the neural network, OFM channels of a previous layer may serve as the input for the remaining layers). Each IFM channel may be a two-dimensional (2D) matrix. Therefore, the number of IFM channels of the IFM data may form an IFM tensor. The IFM tensor may be a three-dimensional (3D) structure or a 3D matrix including a plurality of IFM pixels/values. According to various examples, a tiling technique to store the IFM tensors in the memory 202, which may reduce memory size requirements, may be applied. According to the tiling technique, the IFM tensor may be stored in a form of IFM tiles. For example, 32 channels of a 16×16 IFM tensor may be stored in a form of four 4×4 IFM tiles. Each 4×4 IFM tile may include 16 IFM pixels of 8 bits each (16 IFM pixels=128 bits). Similarly, the kernel data associated with the convolutional layer of the CNN includes weight/filter parameters having a specific height and width. Each kernel channel of the kernel data may be the 2D matrix. A number of kernel channels of the kernel data may form a kernel tensor. The kernel tensor may be a three-dimensional (3D) structure or a 3D matrix including a plurality of kernel pixels/values. The kernel tensor is responsible for generation of one OFM channel. Because there may be multiple OFM channels, an overall kernel tensor for a given layer of the neural network may be four-dimensional (4D). According to various examples, a tiling technique to store the kernel tensors in the memory 202 in the form of kernel tiles may be applied.

The front-end cores 204a-204n and the back-end accumulators 206a-206n may be configured to process the IFM tensor for generating the OFM tensor. The OFM tensor may be further processed by different layers of the CNN to predict/infer an output for the input. The front-end cores 204a-204n fetch the IFM tensor and the kernel tensor from the memory 202 and perform convolutional operation. Each front-end core 204a-204n may be responsible for processing the number of IFM channels of the IFM tensor and generate updates for the number of OFM channels (partial OFM channels) of the OFM tensor. Thus, the front-end cores 204a-204n process an entirety of the number of IFM channels of the IFM tensor. The back-end accumulators 206a-206n accumulate the partial updates corresponding to each OFM channel generated by the front-end cores 204a-204n. Each back-end accumulator 206a-206n generates one OFM channel.

In an example, an IFM tensor of 16×16×32 (32 channels) needs to be processed to produce the OFM tensor of 14×14×16 (channels) using the kernel tensor of 3×3×32×16. The 32 channels of the IFM tensor are distributed to 4 front-end cores. Each front-end core may be responsible for processing 8 IFM channels of the IFM tensor and generate partial sums for 16 OFM channels (partial 16 OFM channels) of the OFM tensor. 16 back-end accumulators further enable to accumulate the partial 16 OFM channels of the OFM tensor from each front-end core and generate 16 OFM channels of the OFM tensor.

As illustrated in FIG. 2B, the front-end cores 204a-204n may be configured to perform the convolutional operation by tiling the IFM tensor and the kernel tensor. The front-end cores 204a-204n perform the convolutional operation according to a channel-first input-stationary loop traversal order. In the channel-first input-stationary loop traversal order, the IFM tiles may be fixed and different channels of the kernel tiles may be used.

In accordance with the channel-first input-stationary loop traversal order, the front-end cores 204a-204n convolve the IFM tiles with different kernel channels of the kernel tiles to produce partial OFM tiles in parallel. According to various examples, the front-end cores 204a-204n perform the convolutional operation by exploiting IFM sparsity (non-zero values of the IFM pixels) and kernel sparsity (non-zero values of the kernel pixels). Thus, unwanted convolutional computations (i.e. computations on zero values) may be reduced.

The back-end accumulators 206a-206n may be configured to accumulate the partial OFM tiles produced by the front-end cores 204a-204n and generate the OFM tiles. The OFM tiles may be combined to form the OFM tensor for the IFM tensor. Further, the OFM data may be formed by generating the OFM tile of different channels at a time instead of generating a single OFM pixel at a time. Thus, execution time and power dissipation may be reduced.

FIGS. 2A and 2B show exemplary units of the accelerator 200, but the configuration is not limited thereto, and the accelerator 200 may be implemented to include a lesser or a greater number of units. Further, the labels or names of the units are used only for illustrative purpose and may be changed to other labels or names. Further, one or more units may be combined together to perform same or substantially similar function in the accelerator 200.

Figure 3:
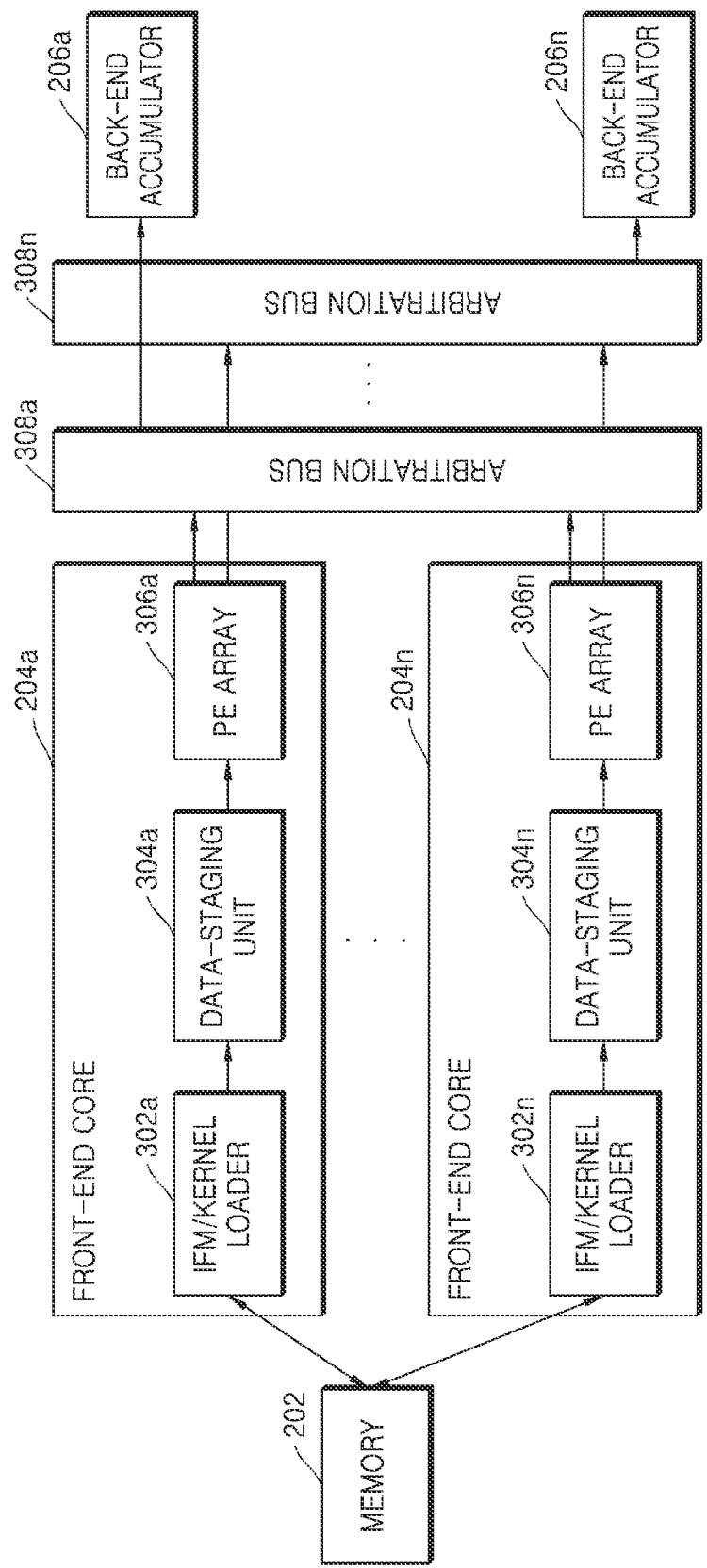
FIG. 3 is a block diagram illustrating various units of front-end cores of an accelerator, according to an example.

FIG. 3 is a block diagram illustrating various units of the front-end cores 204a-204n of the accelerator 200, according to an example.

The front-end cores 204a-204n include IFM/kernel loaders 302a-302n, data-staging units 304a-304n and PE arrays 306a-306n. For example, the front-end core 204a includes an IFM kernel/loader 302a, a data staging unit 304a and a Processing Element (PE) array 306a. Similarly, the front-end core 204n includes an IFM kernel/loader 302n, a data staging unit 304n and a PE array 306n.

The IFM/kernel loaders 302a-302n may be configured to fetch the IFM tiles of the IFM tensor from the IFM buffer of the memory 202 and the kernel tiles of the kernel tensor from the kernel buffer of the memory 202. The IFM/kernel loaders 302a-302n pass the fetched IFM tiles and kernel tiles to the respective data-staging units 304a-304n.

The data-staging units 304a-304n maintain a local buffer to store the fetched IFM tiles and the kernel tiles. The data-staging units 304a-304n may be configured to detect non-zero values of the IFM pixels of the fetched IFM tiles and non-zero values of the kernel pixels of the fetched kernel tiles. The data-staging units 304a-304n process the IFM pixels with the kernel pixels to check whether the at least one of the IFM pixels and the Kernel pixels includes a non-zero value. The data-staging units 304a-304n form bitmasks for the IFM pixels and the kernel pixels and compare the bitmasks to check whether the at least one of the IFM pixels and the Kernel pixels includes the non-zero value. On detecting zero values, the data-staging units 304a-304n eliminate or skip the determined zero values of the at least one of the IFM pixels and the kernel pixels. Thus, elimination of the unwanted computations may minimize data traffic between the memory 202 and the front-end cores 204a-204n. Further, the data-staging units 304a-304n pass the non-zero values of the IFM pixels and the appropriate kernel pixels for the IFM pixels to the respective PE arrays 306a-306n.

The PE arrays 306a-306n perform the MAC operation and convolutional operation in accordance with the channel-first input stationary loop traversal order. The MAC operation involves multiplying the IFM pixels of non-zero value with the kernel pixels of non-zero value of the different kernel channels of the kernel tile to produce the partial OFM pixels of the different OFM channels of the OFM tile in parallel. Thus, processing of the coarse grain data (processing the IFM tiles and the kernel tiles in parallel) by the PE arrays 306a-306n reduces the control overhead of convolutional loop traversal. Further, the PE arrays 306a-306n may place the partial OFM pixels of the different OFM channels of the OFM tile on the respective arbitration buses 308a-308n.

The back-end accumulators 206a-206n further fetch the partial OFM pixels of the different OFM channels of the OFM tile from the respective buses 308a-308n and generate the OFM tiles for the IFM tiles.

For the convenience of description, FIG. 3 shows exemplary units of the front-end cores 204a-204n, but the configuration is not limited thereto and the front-end cores 204a-204n may be implemented to include a lesser or a greater number of units. Further, the labels or names of the units are used only for illustrative purpose and may be changed to other labels or names. Further, one or more units may be combined together to perform the same or substantially similar function in the front-end cores 204a-204n.

Figure 4:
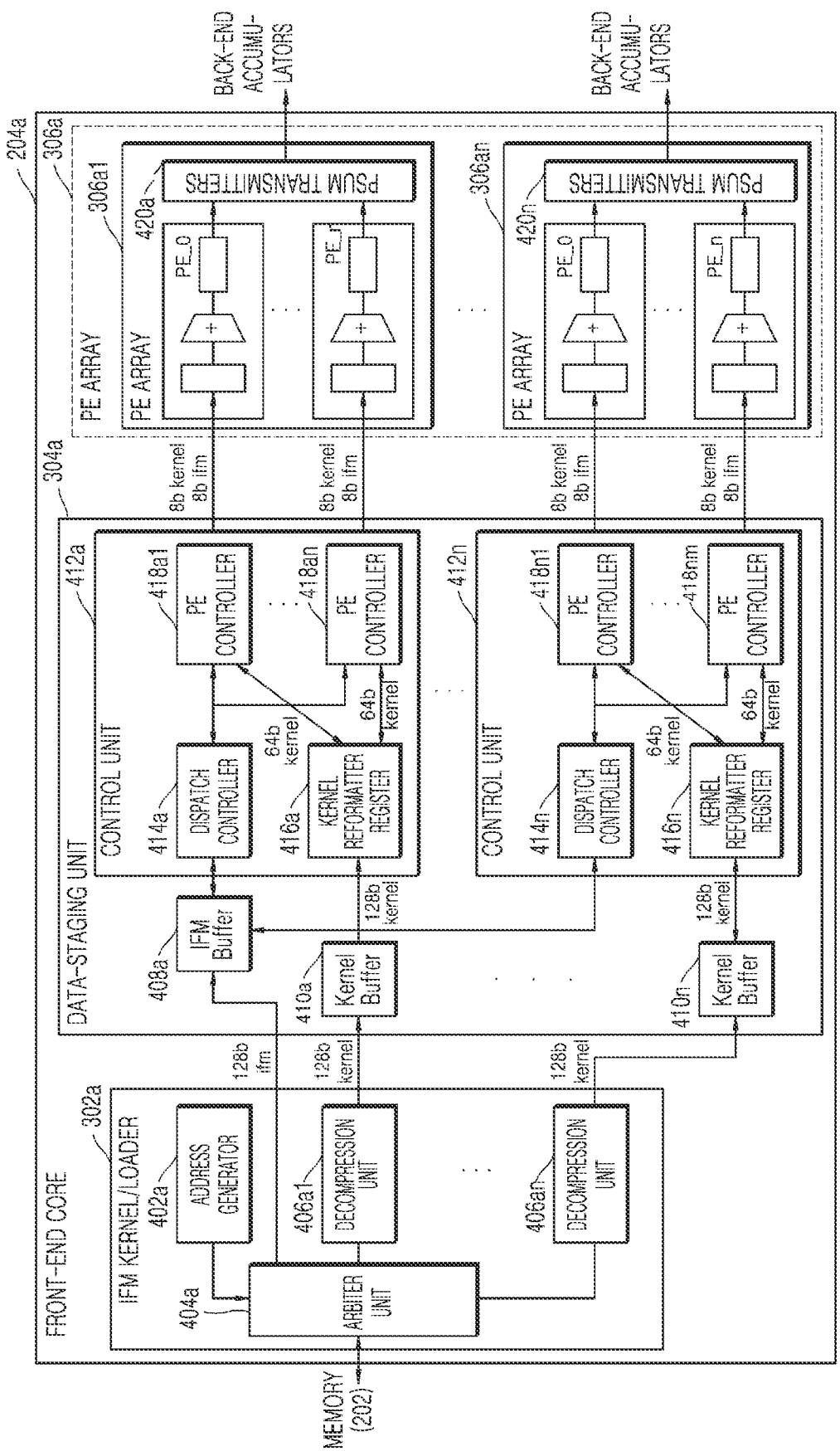
FIG. 4 is a block diagram illustrating various sub-units of front-end cores, according to an example.

FIG. 4 is a block diagram illustrating various sub-units of the front-end cores 204a-204n, according to an example. FIG. 4 is explained considering the various units of the front-end core 204a, but at least one other front-end core 204b-204n may include similar units and corresponding functionalities.

The front-end core 204a includes the IFM kernel/loader 302a, the data-staging unit 304a and the PE array 306a. The IFM kernel/loader 302a includes an address generator 402a, an arbiter unit 404a and a plurality of decompression units 406a1-406an. The address generator 402a may be configured to generate an address, wherein the address may be used for accessing the different kernel channels of the kernel tile stored in different locations of the memory 202. The address generator 402a passes the generated addresses to the arbiter unit 404a. The arbiter unit 404a fetches the IFM tile and different kernel channels of the kernel tile from the memory 202. The arbiter unit 404a provides the fetched IFM tile to the data-staging unit 304a. The arbiter unit 404a further provides the different kernel channels of the kernel tile to the decompression units 406a1-406an. The decompression units 406a1-406an may be configured to perform decompression on the fetched different kernel channels of the kernel tile because the kernel pixels of the different kernel channels stored in the memory 202 may be compressed. The decompression units 406a1-406an provide the decompressed data (the different kernel channels of the kernel tile) to the data-staging unit 304a.

The data-staging unit 304a includes an IFM buffer 408a, a plurality of kernel buffers 410a-410n and a plurality of control units 412a-412n. The IFM buffer 408a stores the IFM tile fetched from the arbiter unit 404a. The kernel buffers 410a-410n store the kernel pixels of the different kernel channels of the kernel tile. The kernel buffers 410a-410n may be implemented as a SRAM. Each kernel buffer 410a-410n may provide the kernel pixels of the different kernel channels required for processing the IFM pixels to the control units 412a-412n.

The control units 412a-412n form streams of the IFM and the kernel pixel for processing by receiving from the IFM buffer 408a and the at least one kernel buffer 410a-410n. Further, the control units 412a-412n include a plurality of dispatch controllers 414a-414n, a plurality of kernel reformatter registers 416a-416n and a plurality of PE controllers 418a1-418an to 418n1-418nm. The dispatch controllers 414a-414n may be configured to fetch the IFM pixels of the IFM tile from the IFM buffer 408a and provide the fetched IFM pixels to the PE controllers 418a1-418an to 418n1-418nm. The kernel reformatter registers 416a-416n fetch and store the kernel pixels of the different kernel channels required for processing the IFM pixels of the IFM tile. The kernel reformatter registers 416a-416n provide the kernel pixels of the different kernel channels to the PE controllers 418a1-418an to 418n1-418nm.

The PE controllers 418a1-418an to 418n1-418nm may be configured to detect the IFM pixels and the kernel pixels including non-zero values on receiving the IFM pixels from the dispatch controllers 414a-414n and the kernel pixels from the kernel reformatter registers 416a-416n. The PE controllers 418a1-418an to 418n1-418nm represent the received IFM pixels and kernel pixels in the form of a vector (for example, 1×1×N element vector) format.

The PE controllers 418a1-418an to 418n1-418nm check values of the vector of the IFM pixels and the vector of the kernel pixels to generate the bitmasks for the IFM pixels and the kernel pixels. Further, the PE controllers 418a1-418an to 418n1-418nm compare bitmasks corresponding to the IFM pixels and the kernel pixels to detect whether the at least one of the IFM pixels and the Kernel pixels include zero value or non-zero value. The PE controllers 418a1-418an to 418n1-418nm may include zero comparators to generate the bitmasks of the IFM pixels and the kernel pixels. The zero comparators check each value/bit in the vector of the IFM pixels to determine whether each value of the IFM pixels corresponds to zero value or the non-zero value. The zero comparators mark corresponding bit position in the bitmasks of the IFM pixels as '0' on determining zero value and mark corresponding bit position in the bitmasks of the IFM pixels as '1' on determining the non-zero value. Similarly, the zero comparators check each value/bit in the vector of the kernel pixels to determine whether each value of the kernel pixels corresponds to zero value or non-zero value. The zero comparators mark corresponding bit position in the bitmasks of the kernel pixels as '0' on determining the zero value and mark corresponding bit position in the bitmasks of the kernel pixels as '1' on determining the non-zero value.

In an example, each of the PE controllers 418a1-418an to 418n1-418nm receives 1×1×8 vector of the IFM Pixels, wherein the 1×1×8 vector corresponds to 8 IFM pixels from 8 different channels with same X-Y coordinate. Each of the PE controllers 418a1-418an to 418n1-418nm may use 8 zero comparators to generate 8 bitmasks of the IFM pixels. Each zero comparator may check whether the corresponding IFM pixel has zero value or not. When the value of the IFM pixel is zero, then corresponding bit position in the bitmask of the IFM pixel is marked as '0'. When the value of the IFM pixel is non-zero, then the corresponding bit position in the bitmask of the IFM pixels is marked as '1'.

On determining the zero values of the IFM pixels and the kernel pixels using the bitmasks, the PE controllers 418a1-418an to 418n1-418nm eliminate or skip the IFM pixels and the kernel pixels with zero values. The PE controllers 418a1-418an to 418n1-418nm provide the IFM pixels including the non-zero values to the PE arrays 306a1-306an. Further, the dispatch controllers 414a-414n select the kernel pixels of the different channels from the kernel reformatter registers 416a-416n, which may be required for processing the IFM pixels including non-zero values. The dispatch controllers 414a-414n provide the selected kernel pixels of the different channels to the PE arrays 306a1-306an.

Each of the PE arrays 306a1-306an includes a plurality of PEs PE_0-PE_n. The PEs PE_0-PE_n of each of the PE arrays 306a1-306an perform the convolutional operation (according to the channel first input-stationary loop traversal order) for processing the IFM pixels to produce the partial OFM pixels of the different OFM channels in parallel. The convolutional operation involves a Multiply-Accumulate operation which further includes performing vector multiplications of the IFM pixels with the kernel pixels of the different kernel channels and adding and accumulating the results of the vector multiplications in each of Psum transmitters 420a-420n to produce the partial OFM pixels of the different OFM channels in parallel. Thus, each of the PE arrays 306a1-306an may produce the multiple partial OFM pixels of the different OFM channels of the OFM tile instead of producing a single OFM pixel. In an example, the PEs PE_0-PE_n of each of the PE arrays 306a1-306an may be synchronized across the OFM tile at coarse tile granularity to reduce control and synchronization overhead. In another example, the PEs PE_0-PE_n may be synchronized at a kernel tile boundary for improving the performance of the accelerator 200. In yet another example, the PEs PE_0-PE_n may be synchronized at a kernel pixel boundary to improve area utilization.

Further, the multiple partial OFM pixels of the different OFM channels may be accumulated by the back-end accumulators 206a-206n to produce the OFM tile for the IFM tile. The back-end accumulators 206a-206n add the partial OFM pixel values received from the front-end cores 204a-204n in a pixel wise manner to generate the OFM tile.

In an example, the accelerator 200 including four front-end cores 204a-204d and a 16×16 IFM tensor associated with the input needs to be processed. Further, the 16×16 IFM tensor may be stored in a form of four-4×4 (16 pixels of each 8 bit) IFM tiles in the memory 202. Further, a 5×5 kernel tensor may be used for processing the 16×16 IFM tensor. The 5×5 kernel tensor may be stored in a form of 4×4 kernel tiles in the memory 202. Each of the front-end core 204a/204b/204c/204d enables to process the 4×4 IFM tile.

For processing the 4×4 IFM tile, the front-end core 204a includes 16 PE arrays. Further, in each front-end core (for example: 204a), the data-staging unit includes 16 kernel buffers (410a-410p) and 16 control units (412a-412p). Further, each of the control units 412a-412p includes the 16 PE controllers 418a1-418ap. The arbiter unit 404a of the IFM kernel/loader of the front-end core 204a fetches 128 bits (16 pixels of each 8 bits at a time) of IFM pixels from the memory 202. Further, based on the addresses generated by the address generator 402a, the arbiter unit 404a fetches 128 bits of kernel pixels (16 pixels of each 8 bits at a time which is required for processing 128 bits of IFM pixels) of different kernel channels of the kernel tile stored in the memory 202. Further, the arbiter unit 404a passes the 128 bits of IFM pixels to the IFM buffer 408a of the data-staging unit 304a. The arbiter unit 404a provides the fetched 128 bits of kernel pixels to the 16 decompression units 406a-406p. The decompression units 406a-406p decompress the 128 bits of kernel pixels and provide the decompressed 128 bits of kernel pixels to 16 kernel buffers of the data-staging unit 304a.

The IFM buffer 408a passes 1024 bits of the IFM pixels to dispatch controllers of the 16 control units. The 1024 bits corresponds to a 3D IFM tile of size 4×4×8 pixels and 8 bits per pixel. Each dispatch controller divides the 4×4×8 pixels among 16 PE controllers, wherein each PE controller receives 8 pixels. Therefore, each PE controller receives 64 bits of the IFM pixels. Further, each kernel reformatter register provides 64 bits of kernel pixels to the respective PE controllers. The 64 bits corresponds to a kernel tensor of 1×1×8 that may be 8 kernel pixels each of 8 bits from 8 different kernel channels. The 16 PE controllers of each control unit together process the IFM and kernel tensors of size 4×4×8. Each PE controller processes the IFM and kernel tensors of size 1×1×8 and generates bitmasks (vectors) for the 1×1×8 IFM pixels and 1×1×8 kernel pixels. Each bit in a given bitmask indicates if the corresponding pixels are zero or non-zero values. On identifying the zero values, the PE controllers of each control unit eliminate the zero values. Thus, unwanted computations may be eliminated in order to reduce the execution time and the power dissipation. In an example, the PE controller generates a IFM bitmask/vector Z, NZ, NZ, Z and a Kernel bitmask/vector Z, Z, NZ, Z, where Z denotes zero, and NZ denotes non-zero. The PE controller compares the bits of the IFM bitmasks and the Kernel bitmasks at each position to check the IFM pixels and the kernel pixels having the zero values. In this example, the PE controller may detect a non-zero value pair at a third position including the IFM pixel having the non-zero value and the kernel pixel having the non-zero value. The PE controller may detect zero value pairs at a first position, a second position and a fourth position since either the IFM pixels or the kernel pixels having the zero value at the first, second and fourth positions. When there is no non-zero value pair (i.e., there is the zero-value pair), the PE controller then performs zero skipping wherein then the OFM pixels remains unchanged. Further, the PE controller obtains the IFM pixels of successive IFM tiles and the kernel pixels of the successive kernel tiles based on the traversal order for performing the convolutional operation or the MAC operation.

Further, each PE controller stores two 64 bits tensors locally for generating the bitmasks for the IFM pixels and the kernel pixels. On determining the non-zero values of the IFM pixels, the 16 PE controllers of each control unit divide the 128 bits (16 pixels, each 8 bit of different channels) of the IFM pixels into 16 batches each including 8 bits of the IFM pixels. Further, the 16 PE controllers of each controller unit provide the 8 bits of the IFM pixels to each PE of the 16 PE arrays associated with each PE array. The PE arrays together process an IFM 3D tile of dimension (4×4×8). Each of the 16 PE arrays processes an IFM vector of dimension (1×1×8) independently by performing zero skipping. During zero skipping, each PE skips zero value in their 1×1×8 vector and skips to non-zero values. Thus, at any point in time, the different PE arrays may be at different channel positions in their respective (1×1×8) vector.

Further, the dispatch controller of each control unit selects the 8 bits of kernel pixels of the different kernel channels from the kernel reformatter register and provides the 8 bits of the kernel pixels to the 16 PEs of each PE array. The 16 PEs of each PE array perform the MAC operations on the received IFM pixels and kernel pixels to produce the multiple partial OFM pixels of the different OFM channels. The multiple partial OFM pixels of the different OFM channels may be used by the back-end accumulators to form the OFM tile for the 4×4 IFM tile.

FIG. 4 shows exemplary units of the front-end cores 204a-204n, but the configuration is not limited thereto, and the front-end cores 204a-204n may be implemented to include a lesser or a greater number of units. Further, the labels or names of the units are used only for illustrative purpose and may be changed to other labels or names. Further, one or more units may be combined together to perform same or substantially similar function in the front-end cores 204a-204n.

Figure 5:
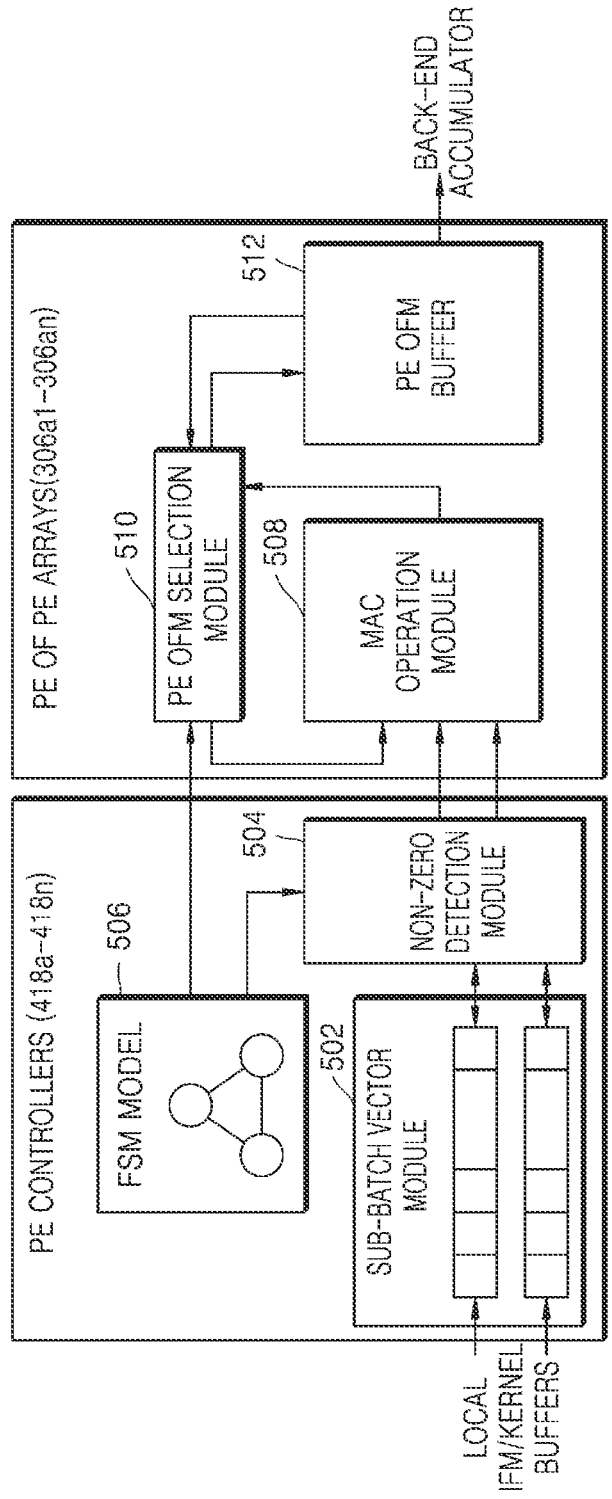
FIG. 5 is a block diagram illustrating various units of a Processing Element (PE) controller and a PE of a PE array, according to an example.

FIG. 5 is a block diagram illustrating various units of the PE controller 418a-418n and the PE of the PE array 306a1-

306an, according to an example. Referring to FIG. 5, each PE controller 418a-418n includes a sub-batch vector module 502, a non-zero detection module 504 and a finite state machine (FSM) 506. The sub-batch vector module 502 may be configured to hold the vectors of the IFM pixels and the kernel pixels. The sub-batch vector module 502 generates the bitmasks for the IFM pixels and the kernel pixels by checking if each individual IFM and kernel pixel in the IFM and kernel vectors is zero or not. The sub-batch vector module 502 provides the bitmasks generated for the IFM pixels and the kernel pixels to the non-zero detection module 504. The non-zero detection module 504 along with the FSM 506 compares the bitmasks of the IFM pixels and the kernel pixels to detect non-zero values of the IFM pixels and the kernel pixels (a non-zero IFM and kernel pixel pair) by skipping the zero values in the bitmasks. The non-zero detection module 504 along with the FSM 506 transmits the non-zero IFM pixel and kernel pixel pair to the respective PE of the PE arrays 306a-306n in every clock cycle.

Each PE of the PE arrays 306a-306n includes an MAC operation module 508, a PE OFM selection module 510 and a PE OFM buffer 512. The MAC operation module 508 receives sub-batches of IFM pixels and the kernel pixels from the PE controllers 418a-418n. The MAC operation module 508 multiplies the IFM pixels with the kernel pixels of the different kernel channels and stores intermediate results (the results of the multiplication) in the PE OFM buffer module 512. The PE OFM selection module 510 generates vectors/X-Y positions/coordinates for the partial OFM pixels generated by the MAC operation module 508. The X-Y positions for the partial OFM pixels may be generated using vectors/X-Y positions of the IFM pixels and the kernel pixels that may be obtained from the PE controllers 418a-418n. The PE OFM selection module 510 further stores the partial OFM pixels in the PE OFM data buffer 512 which may be further provided to the back-end accumulators 206a-206n.

FIG. 5 shows exemplary units of each of the PE controllers 418a-418n of the control units 412a-412n and each PE of the PE arrays 306a1-306an for the convenience of description, but the configuration is not limited thereto, and each of the PE controllers 418a-418n of the control units 412a-412n and each PE of the PE arrays 306a1-306an may include a lesser or a greater number of units. Further, the labels or names of the units are used only for illustrative purpose and may be changed to other labels or names. Further, one or more units may be combined together to perform same or substantially similar function in each of the PE controllers 418a-418n of the control units 412a-412n and each PE of the PE arrays 306a1-306an.

Figure 6:
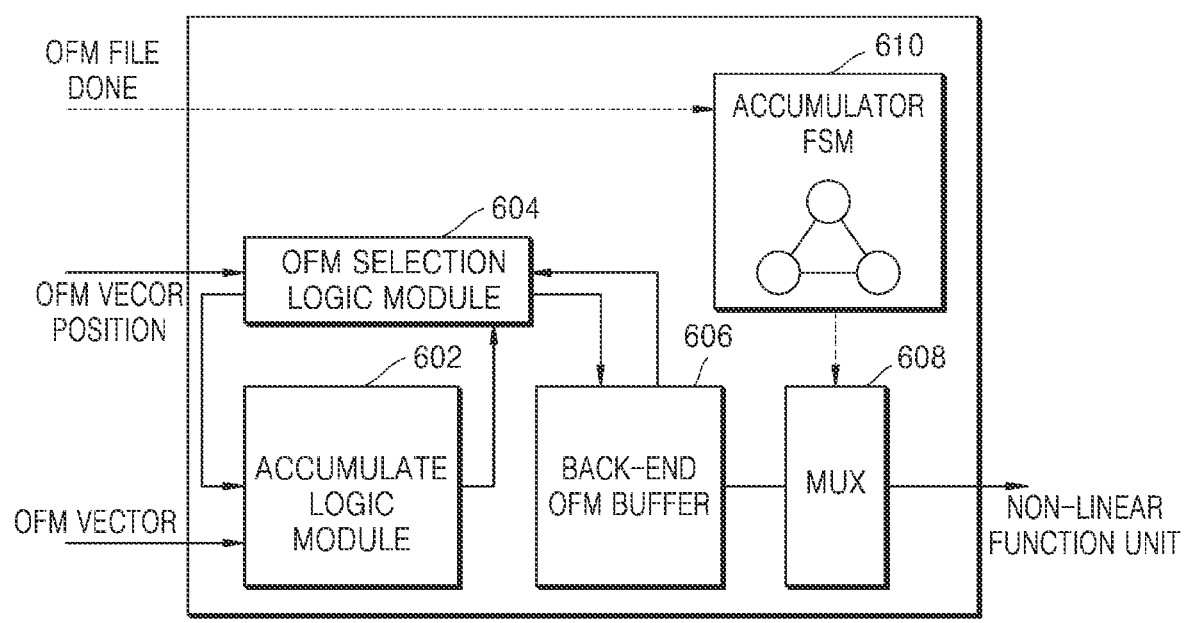
FIG. 6 is a block diagram illustrating various units of a back-end accumulator, according to an example.

FIG. 6 is a block diagram illustrating various units of the back-end accumulator 206a-206n, according to an example. Referring to FIG. 6, each back-end accumulator 206a-206n includes an accumulate logic module 602, an OFM selection logic module 604, a back-end OFM buffer 606, a multiplexer 608 and an accumulator FSM 610. The OFM selection logic module 604 may be configured to receive the X-Y positions for the partial OFM pixels from the PE arrays 306a1-306an. The OFM selection logic module 604 selects an OFM vector including OFM pixels from the back-end OFM buffer 606 that needs to be updated. The OFM selection logic module 604 selects the OFM vector based on the received X-Y positions of the partial OFM pixels. The accumulate logic module 602 includes adders and small set of entries. The accumulate logic module 602 receives the partial OFM pixels from the PEs and the OFM vector from the OFM selection logic module 604. Further, the accumulate logic module 602 adds and accumulates an OFM vector of the partial OFM pixels received from the PEs with the OFM vector selected by the OFM selection logic module 604. The accumulate logic module 602 stores a result of the accumulation in the back-end OFM buffer 606 through the OFM selection logic module 604. The back-end OFM buffer 606 reads the index/vector position of the OFM vectors of the OFM pixels and provides the index/vector position of the OFM vectors to the multiplexer 608. The multiplexer 608 combines the OFM vectors to form the OFM channels of the OFM tile using the accumulator FSM 610. The OFM tile generated for the IFM tile may be stored in the memory 202.

FIG. 6 shows exemplary units of each of the back-end accumulators 206a-206n, but the configuration is not limited thereto, and each of the back-end accumulators 206a-206n may include a lesser or a greater number of units. Further, the labels or names of the units are used only for illustrative purpose and may be changed to other labels or names. Further, one or more units may be combined together to perform same or substantially similar function in each of the back-end accumulators 206a-206n.

Figure 7A:
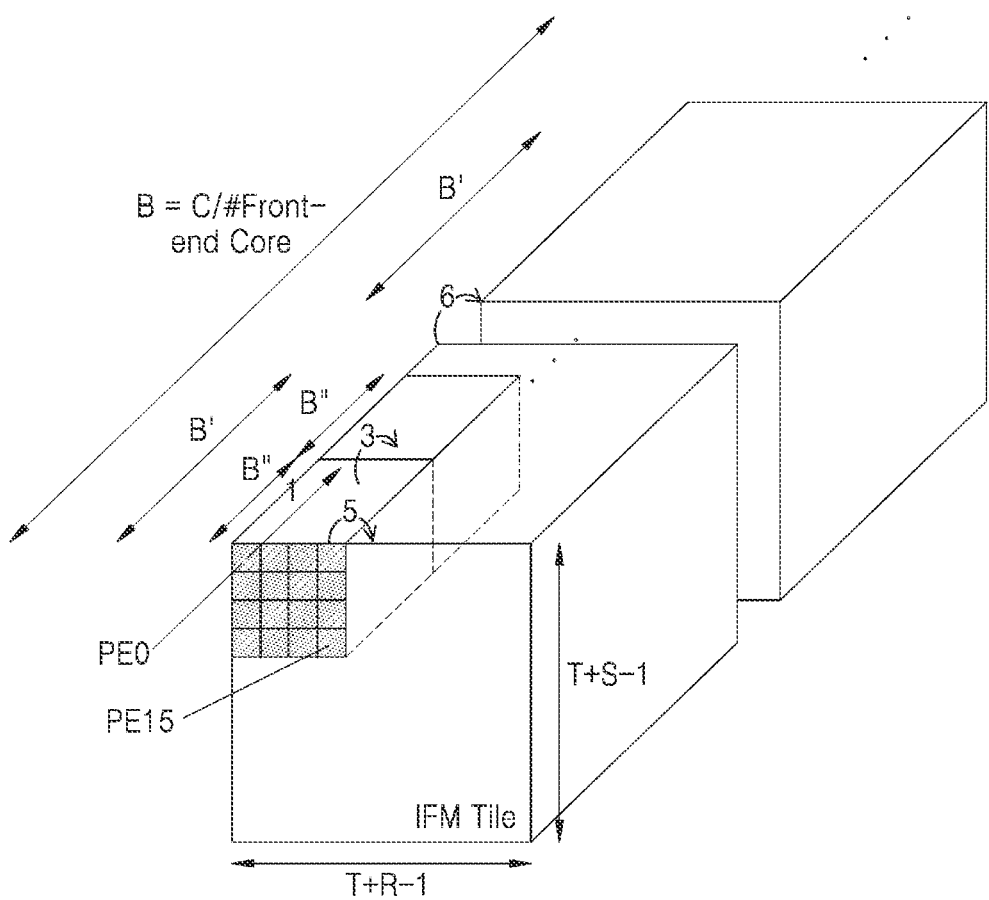
FIGS. 7A and 7B are example diagrams illustrating a tiled convolutional operation performed by each of front-end cores according to the channel-first input-stationary based loop traversal order, according to an example.
Figure 7B:
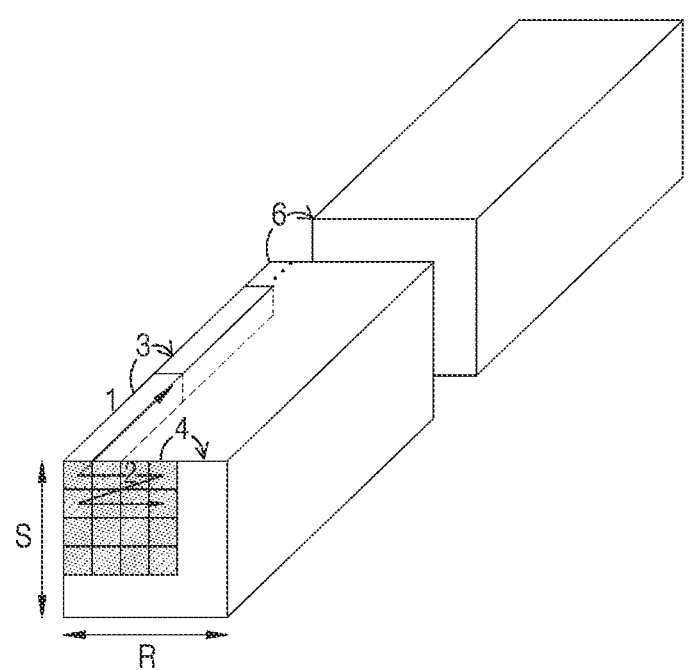

FIGS. 7A and 7B are example diagrams illustrating the tiled convolutional operation performed by each of the front-end cores 204a-204n according to the channel-first input-stationary based loop traversal order, according to an example. When a 16×16 IFM tensor (32 channels) needs to be processed by the accelerator 200 including front-end cores 204a-204d, the number of channels 'B' need to be processed by each front-end core and may be calculated as:

$$B = C/(\text{number of front-end cores})$$

'C' indicates number of channels of the IFM tensor. Since in the depicted example, 'C'=32 and number of front-end cores=4, the number of channels 'B' needs to processed by each front-end core may be equal to 8 channels (16×16×8 IFM tensor that is four 4×4 IFM tiles in X-Y dimension and 8 channels). Further, examples herein are explained the tiled convolutional operations being performed by the front-end core 204a, other front-end cores 204b-204d perform the tiled convolutional operations in a similar manner.

The IFM kernel/loader 204a of the front-end core 204a fetches a 4×4 IFM tile (8 channels) of dimension (T+S−1)×(T+R−1) and a kernel tile of dimension (S×R) from the memory 202 to produce an OFM (x,y) tile of dimension (T×T), wherein (T+S−1) may be considered as 16 but is not limited thereto. Further, the front-end core 204a may include 16 controller units and 16 PE arrays for processing 16 different OFM channels concurrently. Further, each control unit includes 16 PE controllers and each PE array includes 16 PEs. The 16 controller units and the 16 PE arrays may perform batch wise processing of the 4×4 IFM tile (8 channels). Thus, processing of the 4×4 IFM tile (8 channels) may be divided into 'BI' batches. Further, each 'BI' may be divided into 'BII' sub-sizes/loop bounds.

At loop 0, each PE controller of 16 control units performs the parallel processing of 16 IFM pixels corresponding to the 4×4 IFM tile with a given kernel pixel. Further, at loop 1, each PE controller of 16 control units multiplies 4×4×8 IFM pixels with 1×1×8 kernel pixels, wherein 8 kernel pixels from different channels form the 'BII' sub-size. Each PE controller of 16 control units may eliminate or skip the zero values. Further, the non-zero values of the IFM pixels and the suitable non-zero values of the kernel pixels of the different kernel channels may be provided to each PE of 16 PE arrays.

At loop 2, different kernel vectors of the kernel pixels of shape 1×1×8 may be traversed within the 3D kernel tile of dimension 4×4×8. At loop 3, each PE of 16 PE arrays may fetch the 8 kernel pixels of the different kernel channels to process the fixed 8 IFM pixels (in the second 'BII'' sub-size). At loop 4, each PE of 16 PE arrays finishes the processing of one 4×4×8 kernel tensor and starts the processing of a next 4×4×8 kernel tensor. AT loop 5, each PE of 16 PE arrays finishes the processing of one 4×4×8 IFM tensor and starts the processing of a next 4×4×8 tensor. Further, operations/ traversal described in the loop 0-loop 1 may be continued until the last 'BII'' sub-size. After processing the IFM pixels within the last 'BII'' sub-size, operations described in the loop-6 may be performed.

At loop-6, each PE controller of 16 control units and each PE of 16 PE arrays starts processing the IFM pixels by moving to the next batch sizes 'BI' to produce the partial OFM pixels of the OFM tile (TXT) simultaneously. The operations/traversal described in the loop-0-loop-5 may be repeated for the next batch sizes 'BI'. Further, the operations described in the loop-0-loop-1 may be performed in parallel within 'BI' batches.

In an example, the traversal/the operations described in the loop-0-loop-1 may be represented as;

| | |
|---|---|
| for(ifm_batch in B){ | Loop 6 |
| for(ifm_cell_x_y in | Loop 5 |
| (T + S − 1) × (T + R − 1)){ | |
| for(k_cell_x_y in S × R){ | Loop 4 |
| for(ifm_sub_batch in B'){ | Loop 3 |
| for(k_pixel_x_y in 4 × 4){ | Loop 2 |
| for(ifm_ch in B''){ | Loop 1 |
| for(ifm_pixel_x_y in 4 × 4){ | Loop 0 |
| perform mac_op | |

Figure 7C:
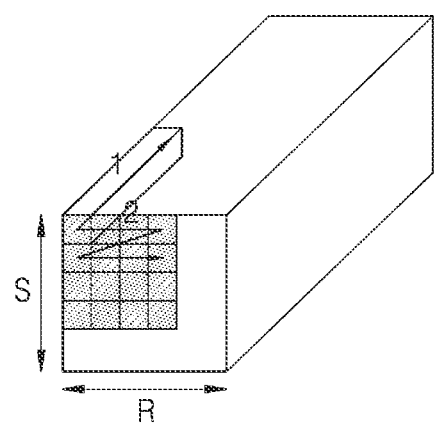
FIG. 7C is an example diagram illustrating a synchronization boundary among PEs in each PE array, according to an example.

FIG. 7C is an example diagram illustrating the synchronization boundary among PEs in each PE array 306a-306n, according to an example. The PEs of each PE array may be synchronized after performing the convolutional operation (as described in loop-2 in FIGS. 5A and 5B). In an example, the PEs of each PE array 306a-306n may be synchronized across the OFM tile at coarse tile granularity to reduce control and synchronization overhead. In another example, the PEs may be synchronized at a kernel tile boundary for improving the performance of the accelerator 200. In yet another example, the PEs may be synchronized at a kernel pixel boundary to improve area utilization.

Figure 8:
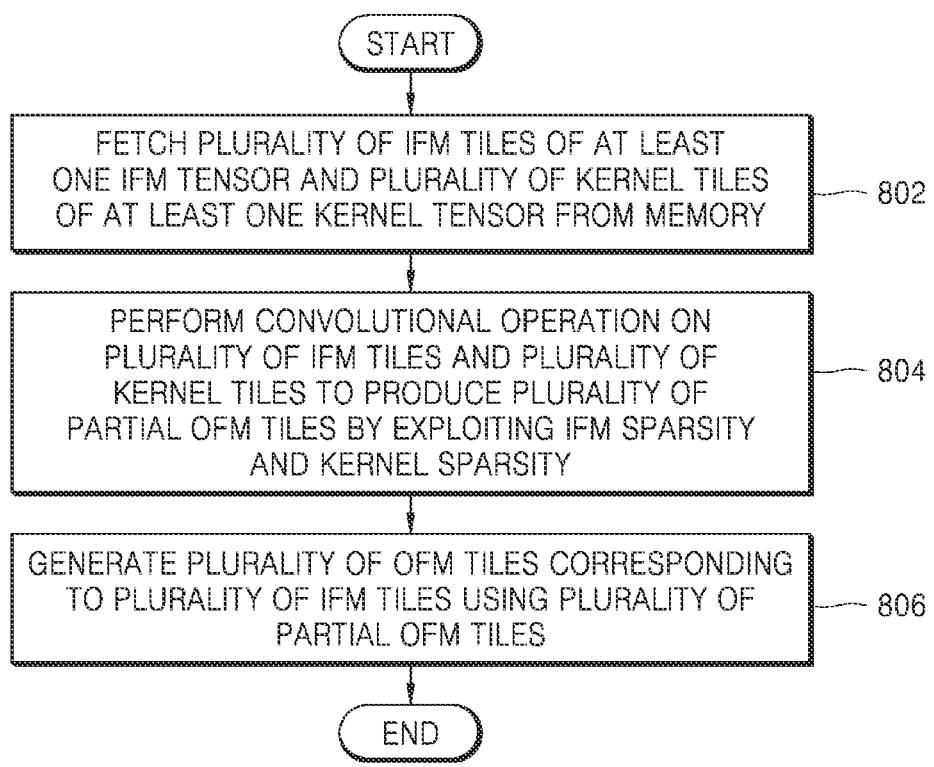
FIG. 8 is a flowchart illustrating a method of eliminating zero computations in the processing of layers in a neural network, according to an example.

FIG. 8 is a flowchart illustrating a method of eliminating zero computations in the processing of layers in a neural network, according to an example.

In operation 802, the front-end cores 204a-204n fetch a plurality of IFM tiles of the at least one IFM tensor and a plurality of kernel tiles of the at least one kernel tensor from the memory 202. Each IFM tile includes the plurality of IFM pixels and each kernel tile includes the plurality of kernel pixels. For fetching the plurality of kernel tiles, the front-end cores 204a-204n generate the memory address for the plurality of kernel channels of the plurality of kernel tiles. The front-end cores 204a-204n fetch a plurality of kernel pixels of the plurality of kernel channels of plurality of kernel tiles from different regions of the memory 202 based on the generated memory addresses. Since the fetched plurality of kernel pixels is compressed, the front-end cores 204a-204n perform decompression on the fetched plurality of kernel pixels of the plurality of kernel channels of the plurality of kernel tiles.

In operation 804, the front-end cores 204a-204n perform the convolutional operation on the plurality of IFM tiles and the plurality of kernel tiles to produce the plurality of partial OFM tiles in parallel by exploiting IFM sparsity and kernel sparsity. The convolutional operation may be performed by at least one front-end core 204a-204n exclusively or by the front-end cores 204a-204n in parallel. On fetching a plurality of IFM pixels of the plurality of IFM tiles and the plurality of kernel pixels of the plurality of kernel tiles, the front-end cores 204a-204n check if at least one IFM pixel of the plurality of IFM pixels including zero value or non-zero value and at least one kernel pixel of the plurality of kernel pixels including zero value or non-zero value. The front-end cores 204a-204n represent the fetched plurality of IFM pixels in the vector format and generate the bitmasks of the plurality of IFM pixels based on the vector format of the IFM pixels. The front-end cores 204a-204n represent the fetched plurality of kernel pixels in the vector format and generate the bitmasks of the plurality of kernel pixels based on the vector format of the IFM pixels. Further, the front-end cores 204a-204n compare the bitmasks of the plurality of the IFM pixels and the plurality of kernel pixels using zero comparators to detect whether the at least one IFM pixel includes zero value or non-zero value and the at least one kernel pixel includes zero value or non-zero value. On detecting the zero value, the front-end cores 204a-204n perform zero skipping that eliminates or skips the at least one IFM pixel including zero value and the at least one kernel pixel including zero value. After eliminating (skipping) the zero values, the front-end cores 204a-204n select the plurality of kernel pixels of the different channels including non-zero value for the plurality of IFM pixels including the non-zero value. Thus, non-zero value pairs of the IFM pixels and kernel pixels may be formed.

Further, the front-end cores 204a-204n perform the MAC operation on the non-zero value pairs of the IFM pixels and the kernel pixels. The MAC operation involves performing vector multiplications on the plurality of IFM pixels including non-zero value and the plurality of kernel pixels including non-zero value and accumulating the results of the vector multiplications to produce a plurality of partial OFM pixels of the plurality of partial OFM tiles. The front-end cores 204a-204n perform the convolutional operation/MAC operation according to the channel-first input stationary loop traversal based order.

In operation 806, the back-end accumulators 206a-206n generate a plurality of OFM tiles corresponding to the plurality of IFM tiles using the produced plurality of partial OFM tiles. The back-end accumulators 206a-206n accumulate the plurality of partial OFM pixels from the front-end cores 204a-204n and combine the plurality of partial OFM pixels based on associated index to generate the plurality of OFM tiles.

Figure 9:
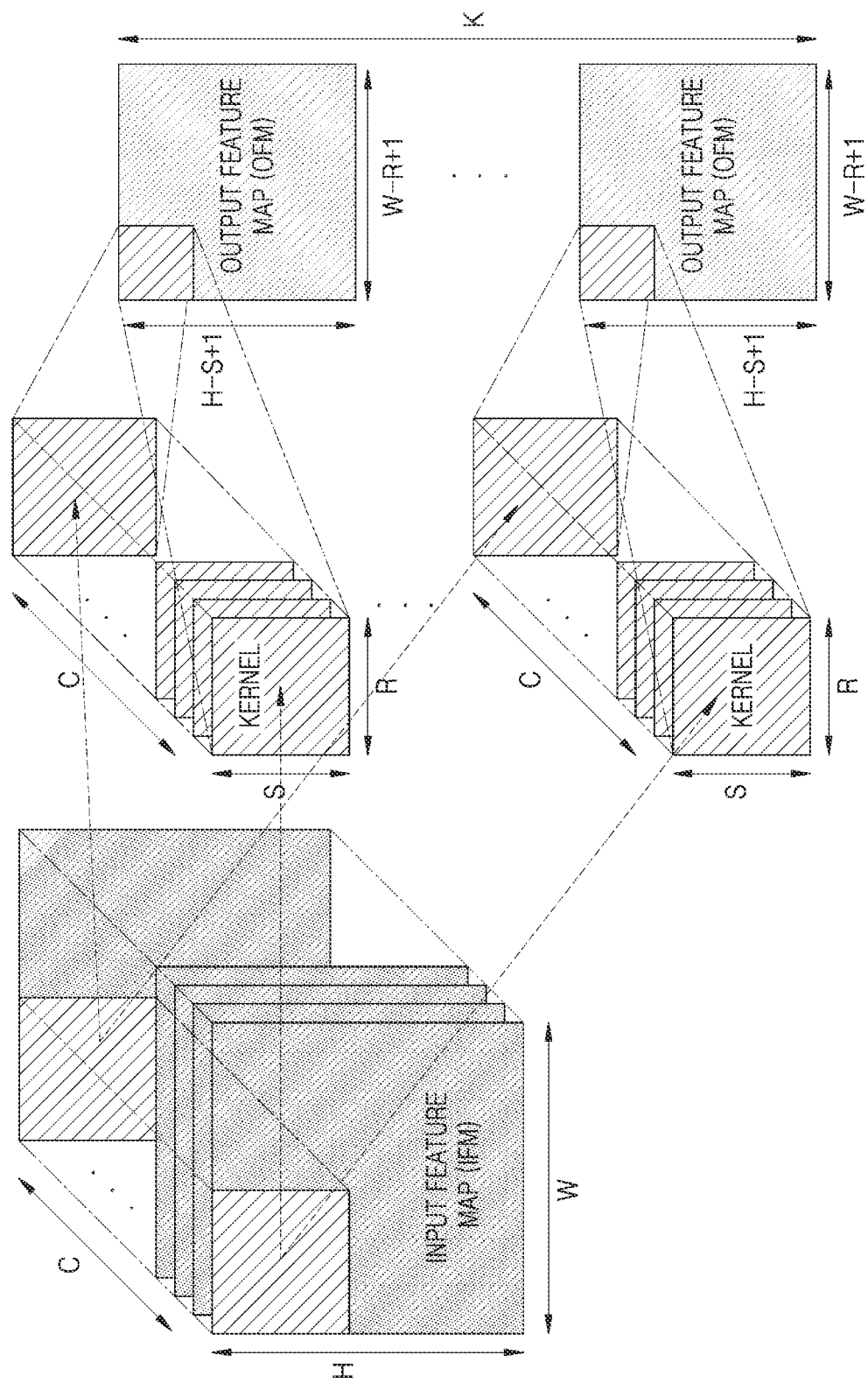
FIG. 9 is a diagram for explaining tiled convolutional operations, according to an example.

FIG. 9 is a diagram illustrating tiled convolutional operations, according to an example. The accelerator 200 receives "C" channels of the IFM tensor of dimension (H×W×C) and 'C' channels of the kernel tensor of dimension (S×R). The accelerator 200 performs the convolutional operations by tiling the IFM and the kernel tensors to produce the OFM tensor in tiles. Each OFM tile may be produced by applying the kernel pixels of all the different kernel channels on the IFM pixels according to the channel-first input-stationary loop traversal order. Further, the convolutional operations may be performed by skipping the zero values of the IFM pixels and the kernel pixels. Thus, the power dissipation of the accelerator 200 and the execution time may be reduced.

Figure 10A:
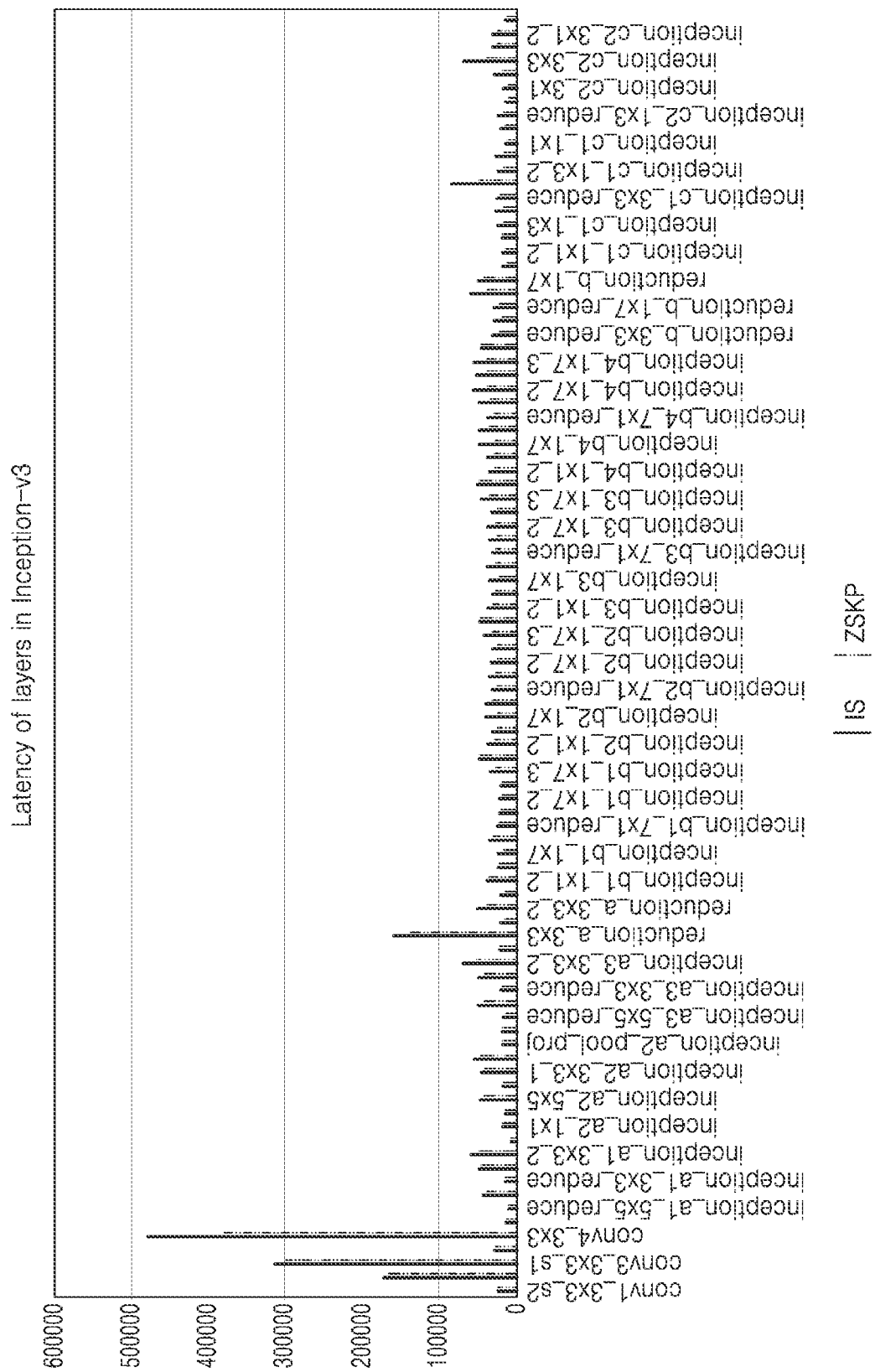

FIGS. 10A and 10B are diagrams illustrating improved latency and execution time due to processing of layers of the CNN due to the elimination of zero computations, according to an example.

A conventional accelerator produces the OFM tensor by convolving the IFM tensor with the kernel tensor, wherein the convolutional operations may include computing zero values of the IFM pixels and the kernel pixels. Further, the OFM tensor may be produced by generating a single OFM pixel at a time. Thus, latency and execution time may be increased due to unwanted computations ((IS) as illustrated in an example graph of FIG. 10A and FIG. 10B).

According to examples described herein, the accelerator 200 performs the convolutional computations by tiling the IFM tensor and the kernel tensor to produce the OFM tensor in tiles. Further, the convolutional computations may be performed by eliminating or skipping the zero values of the IFM pixels and the kernel pixels. Thus, the latency may be improved due to zero skipping (ZSKP) as illustrated in the graph of FIG. 10A. In addition, the execution time may be reduced due to skipping of the zero values as illustrated in the table of FIG. 10B.

The examples may be implemented through at least one software program running on at least one hardware device and performing network management functions to control the elements. The elements shown in FIGS. 2 through 10 may be at least one of a hardware device, or a combination of hardware device and software module.

The examples describe the method and the apparatus for eliminating or skipping zero computations in processing of layers in a neural network. Therefore, it is understood that the scope of the protection is extended to such a program capable of executing the method and apparatus and in addition to a computer readable means including program code for implementation of one or more operations of the method, when the program runs on a server or mobile device or any suitable programmable device. The method is implemented through or together with a software program written in e.g. very high speed integrated circuit Hardware Description Language (VHDL), another programming language, or implemented by one or more VHDL or several software modules being executed on at least one hardware device. The hardware device may be any kind of portable device that may be programmed. The hardware device may also include means which could be e.g. hardware means like e.g. an ASIC, or a combination of hardware and software means, e.g. an ASIC and an FPGA, or at least one microprocessor and at least one memory with software modules located therein. The method according to examples described herein could be implemented partly in hardware and partly in software. Alternatively, examples described herein may be implemented on different hardware devices, e.g. using a plurality of CPUs.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing layers in a neural network, the method comprising:
    obtaining a plurality of Input Feature Map (IFM) tiles of at least one IFM tensor and a plurality of kernel tiles of at least one kernel tensor from a memory;
    performing, by an accelerator, a convolutional operation on the plurality of IFM tiles and the plurality of kernel tiles based on IFM sparsity and kernel sparsity;
    generating, by the accelerator, a plurality of partial Output Feature Map (OFM) tiles; and
    generating, by the accelerator, a plurality of OFM tiles corresponding to the plurality of IFM tiles using the plurality of partial OFM tiles.

2. The method of claim 1, wherein performing the convolutional operation comprises:
    determining whether values of at least one IFM pixel of the plurality of IFM tiles or at least one kernel pixel of the plurality of kernel tiles are zero values or non-zero values;
    detecting at least one non-zero value pair in a case in which the at least one IFM pixel has a non-zero value and the at least one kernel pixel has the non-zero value; and
    performing Multiply-Accumulate (MAC) operations on the at least one non-zero value pair, wherein the accelerator comprises a plurality of Processing Element (PE) arrays for performing the MAC operations.

3. The method of claim 2, further comprising:
    performing a zero skipping on detecting the non-zero value pairs, wherein during the zero skipping at least one OFM pixel remains unchanged; and
    performing the convolutional operation on at least one successive IFM tile and at least one successive kernel tile based on a pre-defined traversal order by performing the zero skipping.

4. The method of claim 3, wherein the determining comprises:
    representing a plurality of IFM pixels of the plurality of IFM tiles and a plurality of kernel pixels of the plurality of kernel tiles in a vector format;
    generating IFM bitmasks for the plurality of IFM pixels and kernel bitmasks for the plurality of kernel pixels based on the represented vector format of the plurality of IFM pixels and the plurality of kernel pixels; and
    comparing the IFM bitmasks and the kernel bitmasks to detect the at least IFM pixel and the at least one kernel pixel having the zero value or the non-zero value in at least one position of the IFM bitmasks and the kernel bitmasks.

5. The method of claim 4, further comprising:
    performing a zero skipping on at least one of the at least one IFM pixel having a zero value in the at least one position of the IFM bitmask and the at least one kernel pixel having the zero value in the at least one position of the kernel bitmasks.

6. The method of claim 4, wherein the at least one non-zero value pair comprises the at least one IFM pixel having the non-zero value in the at least one position of the IFM bitmasks and the at least one kernel pixel having the non-zero value in the corresponding at least one position of the kernel bitmasks, and
    wherein the at least one non-zero value pair is used for generating the at least one OFM pixel.

7. The method of claim 2, further comprising selecting a plurality of kernel pixels of a plurality of kernel channels of the plurality of kernel tiles for detecting the at least one non-zero value pair.

8. The method of claim 2, wherein performing the MAC operations comprises:
   performing vector multiplications on at least one non-zero value pair of the at least one IFM pixel having the non-zero value and the at least one kernel pixel having the non-zero value; and
   accumulating results of the vector multiplications to produce a plurality of partial OFM pixels of a plurality of OFM channels of the plurality of OFM tiles.

9. The method of claim 1, wherein generating the plurality of OFM tiles comprises:
   accumulating a plurality of partial OFM pixels of a plurality of OFM channels of the plurality of partial OFM tiles; and
   combining the plurality of partial OFM pixels to generate the plurality of OFM tiles corresponding to the plurality of IFM tiles using an index associated with the plurality of partial OFM pixels.

10. An apparatus for processing layers in a neural network, the apparatus comprising:
    an accelerator configured to:
       obtaining a plurality of Input Feature Map (IFM) tiles of at least one IFM tensor and a plurality of kernel tiles of at least one kernel tensor from a memory;
       performing a convolutional operation on the plurality of IFM tiles and the plurality of kernel tiles based on IFM sparsity and kernel sparsity;
       generating a plurality of partial Output Feature Map (OFM) tiles; and
       generating a plurality of OFM tiles corresponding to the plurality of IFM tiles using the plurality of partial OFM tiles.

11. The apparatus of claim 10, wherein the accelerator is further configured to:
    determine whether values of at least one IFM pixel of the plurality of IFM tiles or at least one kernel pixel of the plurality of kernel tiles are zero values or non-zero values;
    detect at least one non-zero value pair in a case in which the at least one IFM pixel has a non-zero value and the at least one kernel pixel has the non-zero value; and
    perform Multiply-Accumulate (MAC) operations on the at least one non-zero value pair,
    wherein the accelerator comprises a plurality of Processing Element (PE) arrays for performing the MAC operations.

12. The apparatus of claim 11, wherein the accelerator is further configured to:
    perform a zero skipping on detecting the non-zero value pairs, wherein during the zero skipping at least one OFM pixel remains unchanged; and
    perform the convolutional operation on at least one successive IFM tile and at least one successive kernel tile based on a pre-defined traversal order by performing the zero skipping.

13. The apparatus of claim 12, wherein the accelerator is further configured to:
    represent a plurality of IFM pixels of the plurality of IFM tiles and a plurality of kernel pixels of the plurality of kernel tiles in a vector format;
    generate IFM bitmasks for the plurality of IFM pixels and kernel bitmasks for the plurality of kernel pixels based on the represented vector format of the plurality of IFM pixels and the plurality of kernel pixels; and
    compare the IFM bitmasks and the kernel bitmasks to detect the at least IFM pixel and the at least one kernel pixel having the zero value or the non-zero value in at least one position of the IFM bitmasks and the kernel bitmasks.

14. The apparatus of claim 13, wherein the accelerator is further configured to:
    perform a zero skipping on at least one of the at least one IFM pixel having a zero value in the at least one position of the IFM bitmask and the at least one kernel pixel having the zero value in the at least one position of the kernel bitmasks.

15. The apparatus of claim 13, wherein the at least one non-zero value pair comprises the at least one IFM pixel having the non-zero value in the at least one position of the IFM bitmasks and the at least one kernel pixel having the non-zero value in the corresponding at least one position of the kernel bitmasks, and
    wherein the at least one non-zero value pair is used for generating the at least one OFM pixel.

16. The apparatus of claim 11, wherein the accelerator is further configured to:
    select a plurality of kernel pixels of a plurality of kernel channels of the plurality of kernel tiles for detecting the at least one non-zero value pair.

17. The apparatus of claim 11, wherein the accelerator is further configured to:
    perform vector multiplications on at least one non-zero value pair of the at least one IFM pixel having the non-zero value and the at least one kernel pixel having the non-zero value; and
    accumulate results of the vector multiplications to produce a plurality of partial OFM pixels of a plurality of OFM channels of the plurality of OFM tiles.

18. The apparatus of claim 10, wherein the accelerator is configured to:
    accumulate a plurality of partial OFM pixels of a plurality of OFM channels of the plurality of partial OFM tiles; and
    combine the plurality of partial OFM pixels to generate the plurality of OFM tiles corresponding to the plurality of IFM tiles using an index associated with the plurality of partial OFM pixels.

* * * * *